United States Patent
Tamura et al.

(10) Patent No.: US 6,697,229 B2
(45) Date of Patent: Feb. 24, 2004

(54) HEAD TRANSFER ACTUATOR ASSEMBLY USED IN A TAPE DEVICE WITH A HEAD ASSEMBLY GIVEN A BIAS IN A RADIAL DIRECTION OF THE LEAD SCREW

(75) Inventors: Kazuya Tamura, Tokyo (JP); Clark Janssen, Boulder, CO (US)

(73) Assignees: Mitsumi Electric Co., Ltd., Chofu (JP); Benchmark Storage Innovations, Inc., Boulder, CO (US)

( * ) Notice: Subject to any disclaimer, the term of this patent is extended or adjusted under 35 U.S.C. 154(b) by 94 days.

(21) Appl. No.: 09/970,046

(22) Filed: Oct. 2, 2001

(65) Prior Publication Data

US 2003/0063414 A1 Apr. 3, 2003

(51) Int. Cl.[7] .................................................. G11B 5/55
(52) U.S. Cl. ..................................... 360/261.3; 369/223
(58) Field of Search .......................... 360/261.3, 267.3, 360/267.4, 291.2, 291.3; 369/223

(56) References Cited

U.S. PATENT DOCUMENTS

| | | | | |
|---|---|---|---|---|
| 5,191,575 A | * | 3/1993 | Kido | ........................... 369/223 |
| 5,414,585 A | | 5/1995 | Saliba | |
| 5,793,574 A | | 8/1998 | Cranson et al. | |
| 5,812,347 A | * | 9/1998 | Henke | ..................... 360/261.3 |
| 5,857,634 A | | 1/1999 | Hertrich | |
| 5,862,014 A | | 1/1999 | Nute | |
| 6,241,171 B1 | | 6/2001 | Gaboury | |

FOREIGN PATENT DOCUMENTS

| | | |
|---|---|---|
| JP | 2000-100025 | 4/2000 |
| JP | 2000-100116 | 4/2000 |
| JP | 2000-149491 | 5/2000 |
| WO | WO86/07295 | 12/1986 |
| WO | WO86/07471 | 12/1986 |

\* cited by examiner

Primary Examiner—A. J. Heinz
(74) Attorney, Agent, or Firm—Frishauf, Holtz, Goodman & Chick, P.C.

(57) ABSTRACT

In order to provide a head transfer mechanism capable of absorbing a play of a head assembly not only in a thrust direction but also in a radial direction as well as a head actuator assembly and a tape drive using the same, the head transfer mechanism comprises a lead screw with a thread ridge, a head elevation guiding member, a preload bushing arranged in a hollow opened portion of a head lift, and a compression coil spring for applying the head lift with a pressing force in an axial direction of the lead screw. The head elevation guiding member comprises as an integral structure a head lift on which the head assembly is mounted and a head guide having a thread groove engaged with the lead screw and serving to move the head lift up and down along a rotation center axis following the rotation of the lead screw. In the head elevation guiding member, the head assembly is given a biasing load in a radial direction of the lead screw.

5 Claims, 11 Drawing Sheets

HEAD TRANSFER ACTUATOR ASSEMBLY USED IN A TAPE DEVICE WITH A HEAD ASSEMBLY GIVEN A BIAS IN A RADIAL DIRECTION OF THE LEAD SCREW

BACKGROUND OF THE INVENTION (1) Technical Field

This invention relates to a linear tape storage system represented by DLT (Digital Linear Tape) or LTO (Linear Tape Open) and, in particular, to a magnetic tape head actuator assembly (head transfer mechanism) for use in the system and a tape drive using the same.

(2) Prior Art

A linear tape storage system of the type has been developed as a backup for a computer system. A variety of linear tape storage systems have heretofore been proposed. For example, a digital linear tape drive as the DLT is disclosed in U.S. Pat. No. 5,862,014 or the like.

The digital linear tape drive (hereinafter may simply be called "driving device", "tape drive", or "drive") is adapted to receive a tape cartridge (hereinafter may simply be called "cartridge") having a single reel (supply reel) and includes a take-up reel in the interior thereof. When the tape cartridge is loaded in the driving device, a magnetic tape is pulled out from the tape cartridge to be taken up by the take-up reel through a head guide assembly (HGA). The head guide assembly serves to guide to a magnetic head the magnetic tape (hereinafter may simply be called "tape") pulled out from the tape cartridge. The magnetic head exchanges information between it and the tape. Typically, the head guide assembly comprises an aluminum plate having a boomerang-like shape and a plurality of large guide rollers, six in number, comprising bearings.

The head guide assembly is also called a tape guide assembly and is disclosed, for example, in U.S. Pat. No. 5,414,585. An example of the guide roller is disclosed in Japanese Unexamined Patent Publication No. 2000-100025.

As disclosed in U.S. Pat. No. 5,793,574 for example, a tape drive typically comprises a generally rectangular housing having a common base. The base has two spindle motors (reel motors). The first spindle motor (reel motor) has a spool (take-up reel) permanently mounted to the base and the spool is dimensioned to accept a magnetic tape streaming at a relatively high speed. The second spindle motor (reel motor) is adapted to receive a removable tape cartridge. The removable tape cartridge is manually or automatically inserted into the drive via a slot formed on a housing of the drive. When the tape cartridge is inserted into the slot, the cartridge is engaged with the second spindle motor (reel motor). Prior to rotation of the first and the second spindle motors (reel motors), the tape cartridge is connected to the permanently mounted spool (take-up reel) by means of a mechanical buckling mechanism. A number of rollers (guide rollers) positioned between the tape cartridge and the permanent spool guide the magnetic tape as it streams at a relatively high speed back and forth between the tape cartridge and the permanently mounted spool.

The digital linear tape drive of the above-mentioned structure requires a pulling device for pulling the tape from the supply reel to the take-up reel. Such pulling device is disclosed, for example, in International Publication No. WO86/07471. According to the publication, take-up leader means (first tape leader) is coupled to the take-up reel. To the tape on the supply reel, supply tape leader means (second tape leader) is fixed. The first tape leader has a tab formed at its one end. The second tape leader has a locking hole. The tab is engaged with the locking hole.

Furthermore, a mechanism for joining the first tape leader to the second tape leader is required. Such joining mechanism is disclosed, for example, in International Publication No. WO86/07295.

Japanese Unexamined Patent Publication No. 2000-100116 discloses "Structure of Leader Tape Engaging Part" capable of locking an end of a leader tape (second tape leader) to a tape end hooking part of the tape cartridge without requiring a tab protruding on a lateral side of the leader tape.

U.S. Pat. No. 5,857,634 discloses a lock system for preventing the rotation of the take-up reel of the tape drive when the tape cartridge is not inserted into the drive.

On the other hand, Japanese Unexamined Patent Publication No. 2000-149491 discloses an example of the tape cartridge to be received in the digital linear tape drive.

U.S. Pat. No. 6,241,171 discloses a "tape drive" in which a tape leader is urged from a tape cartridge to a take-up reel without using a buckling mechanism or a take-up leader.

The tape drive further comprises a magnetic tape head actuator assembly. The magnetic tape head actuator assembly is positioned between the take-up spool and the tape cartridge along a tape path defined by a plurality of rollers. In operation, the magnetic tape streams back and forth between the take-up spool and the tape cartridge, coming into close proximity to the magnetic head actuator assembly while streaming along the defined tape path. An example of the magnetic head actuator assembly is disclosed in U.S. Pat. No. 5,793,574 mentioned above.

An existing magnetic tape head actuator assembly comprises a tape head assembly and a head transfer mechanism. The tape head assembly comprises a magnetic head, a head holder to which the magnetic head is mounted, and a pair of flexible printed circuits (FPCs) for electrically connecting the magnetic head and an external circuit. To the head holder, the tape head assembly and the head transfer mechanism are coupled through screws.

On the other hand, the head transfer mechanism comprises a lead screw with a thread ridge having a rotation center axis O extending in a vertical direction, a generally I-shaped head lift which has a hollow center portion opened in a semicylindrical area and which serves to hold the tape head assembly and to move the tape head assembly up and down, a preload bushing arranged in the hollow opened portion of the head lift and having a thread groove engaged with the lead screw, a lead screw gear attached to a lower end of the lead screw and driven by another driving means for rotating the lead screw around the rotation center axis O, and a head guide coupled to the head lift and having a thread groove engaged with the lead screw. In cooperation with the preload bushing, the head guide moves the head lift in an extending direction (vertical direction) of the rotation center axis O in response to the rotation of the lead screw around the rotation center axis O.

The head lift has the above-mentioned hollow opened portion for receiving the preload bushing. The head guide is fixed to the head lift.

Between the preload bushing and the lower surface of an upper end portion of the head lift, a preload spring is located in a compressed state. The preload spring is a compression coil spring. By the preload spring, the preload bushing is continuously subjected to a downward pressing force along the rotation center axis O of the lead screw while the head lift is continuously subjected to an upward pressing force along the rotation center axis O of the lead screw. Also, the head guide is continuously subjected to the upward pressing force along the rotation center axis O of the lead screw because the head guide is attached to the head lift.

A combination of the preload bushing and the preload spring serves as a backlash preventing mechanism for preventing backlash of the actuator assembly.

Specifically, before assembling the actuator assembly, the thread groove of the preload bushing is offset by a half pitch with respect to the thread groove of the head guide. In this state, the lead screw is successively inserted into the head guide, the preload bushing, and a bearing. As described above, by the preload spring, the preload bushing and the head guide are subjected to the downward pressing force along the rotation center axis O of the lead screw and the upward pressing force along the rotation center axis O of the lead screw, respectively. Therefore, while the head lift is moved up and down along the rotation center axis O of the lead screw following the rotation of the lead screw in a clockwise or a counterclockwise direction, an upper surface of the thread groove of the preload bushing is continuously kept in frictional contact with an upper surface of the thread ridge of the lead screw while a lower surface of a thread groove of the head guide is continuously kept in frictional contact with a lower surface of the thread ridge of the lead screw. Thus, it is possible to prevent the backlash between the lead screw and the head lift during movement of the head lift following the rotation of the lead screw.

Because of little variation in elastic force of the preload bushing and the preload spring, it is possible to obtain a stable pressing force in an axial direction of the lead screw.

In the above-mentioned existing magnetic recording tape drive of a fixed-head type, backlash or play of the head lift for moving the head up and down is eliminated as mentioned above. Specifically, the compression spring presses the preload bushing with the thread groove so that thrust play between the head lift and the lead screw is eliminated.

In the existing structure, however, the play in the thrust direction can be absorbed but the play in the radial direction can not be sufficiently absorbed.

SUMMARY OF THE INVENTION

It is an object of this invention to provide a head transfer mechanism capable of absorbing play of a head assembly not only in a thrust direction but also in a radial direction.

It is another object of this invention to provide a head actuator assembly using the above-mentioned head transfer mechanism.

It is still another object of this invention to provide a tape drive comprising the above-mentioned actuator assembly.

According to an aspect of this invention, there is provided a head transfer mechanism for moving a head assembly up and down in an axial direction extending in a vertical direction, wherein the head transfer mechanism comprises a lead screw with a thread ridge having a rotation center axis extending in the axial direction, a head elevation guiding member including as an integral structure a head lift with the head assembly mounted thereon and a head guide having a thread groove engaged with the lead screw and serving to move the head lift up and down along the rotation center axis following the rotation of the lead screw, the head lift having a through hole receiving the lead screw inserted therethrough and a hollow opened portion formed at its center, a preload bushing arranged in the hollow opened portion of the head lift and having a thread groove engaged with the lead screw, and a compression coil spring arranged in the hollow opened portion of the head lift between the preload bushing and the head lift for applying the head lift with a pressing force in the axial direction of the lead screw, the head assembly being given a biasing load within the head elevation guiding member in a radial direction of the lead screw.

According to another aspect of this invention, there is provided an actuator assembly comprising the above-mentioned head transfer mechanism According to still another aspect of this invention, there is provided a tape drive comprising the above-mentioned actuator assembly.

DESCRIPTION OF THE PREFERRED EMBODIMENT

Prior to describing an embodiment of this invention, description will be made of a tape drive including a magnetic tape head actuator assembly according to a previous technique with reference to FIGS. 1 through 9 in order to facilitate an understanding of this invention.

Figure 1:
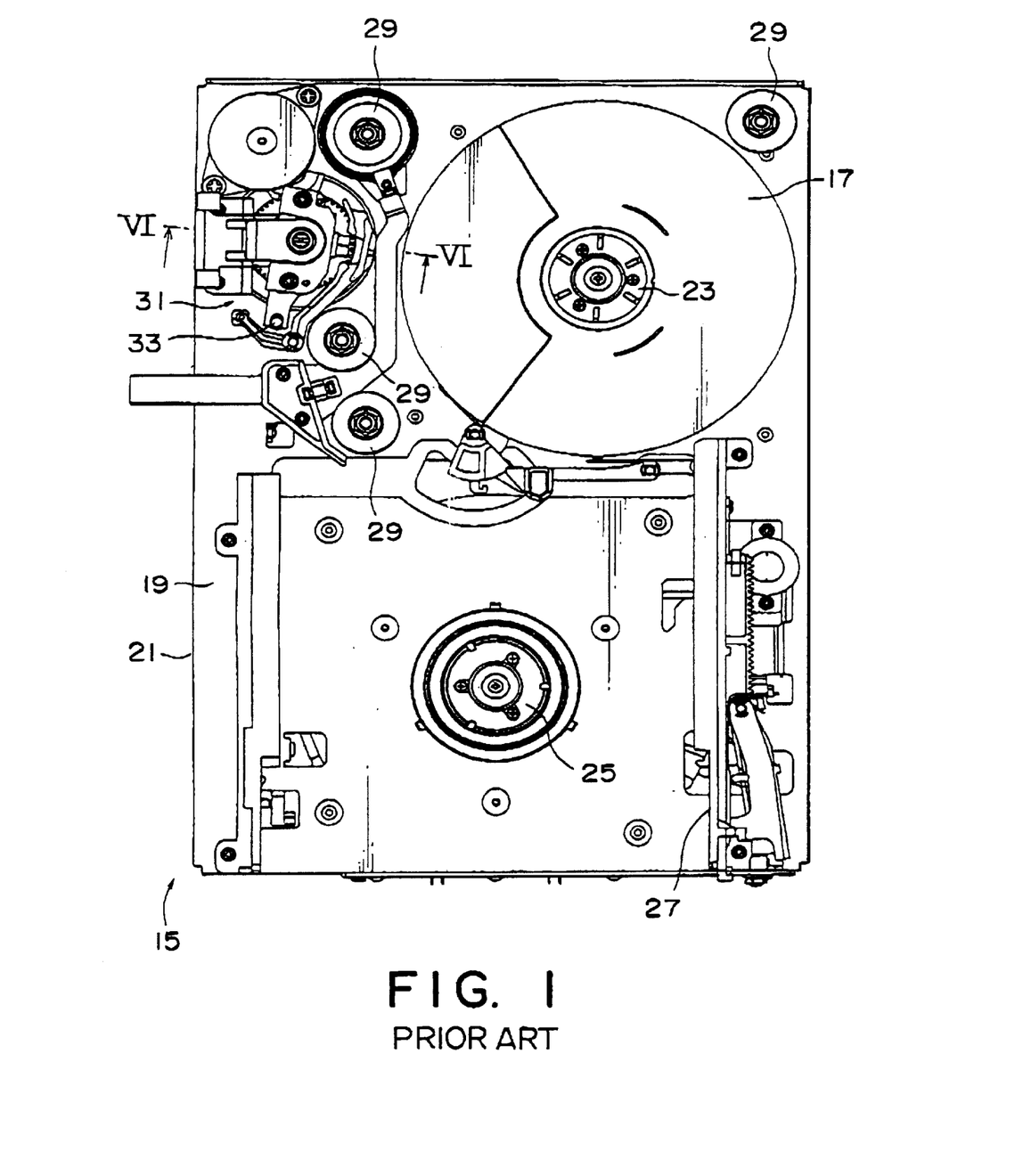
FIG. 1 is a plan view showing a tape drive including a magnetic tape head actuator assembly according to a previous technique in a state where an upper cover is removed.
Figure 2:
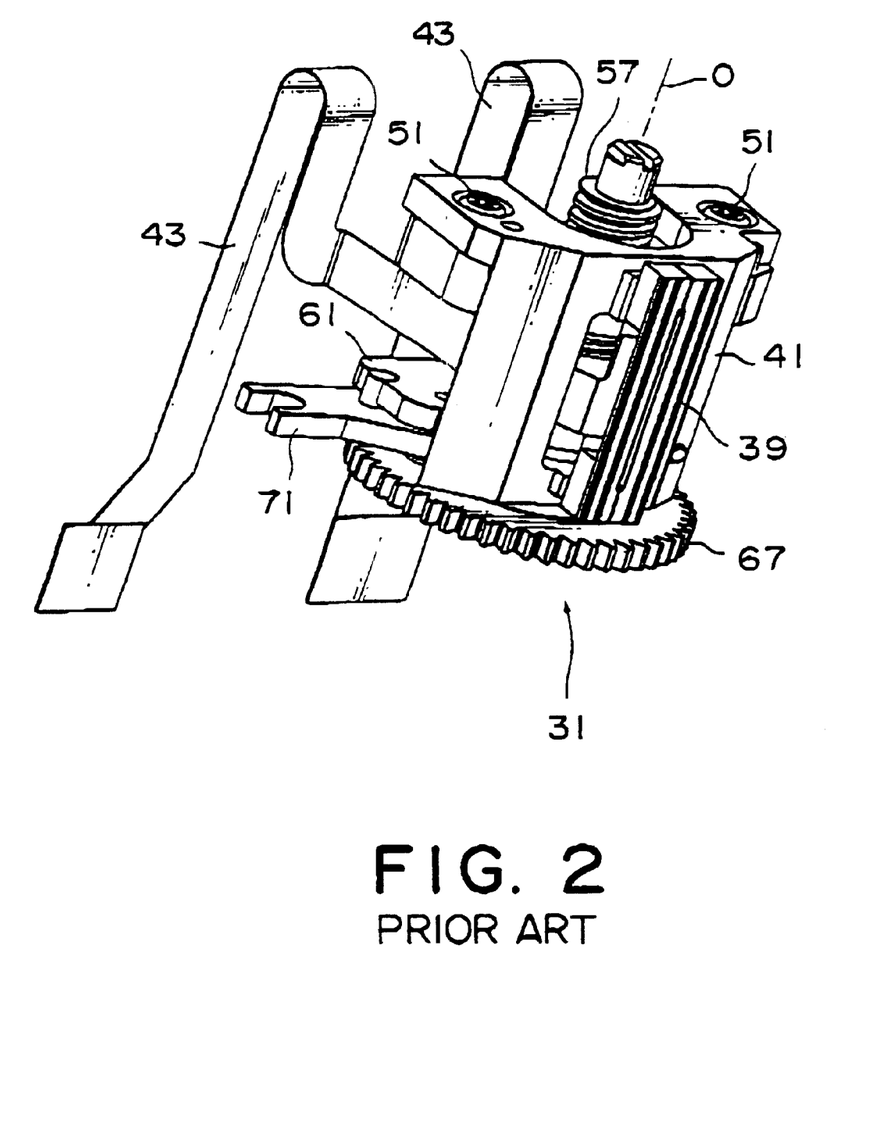
FIG. 2 is a perspective view showing an exterior of the magnetic tape head actuator assembly according to the previous technique.
Figure 3:
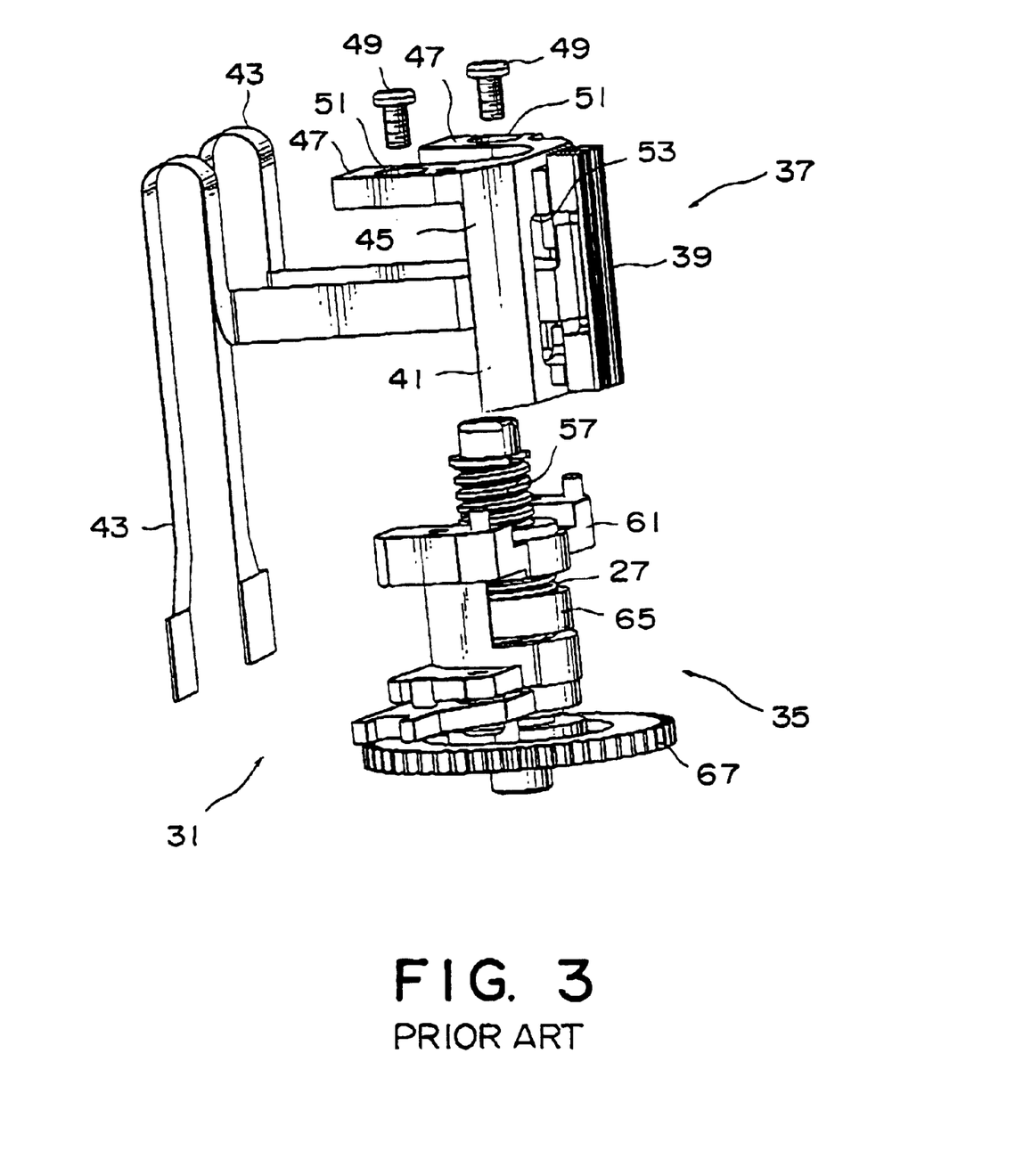
FIG. 3 is an exploded perspective view of the magnetic tape head actuator assembly illustrated in FIG. 2 in a state where a tape head assembly and a head transfer mechanism are separated.
Figure 4:
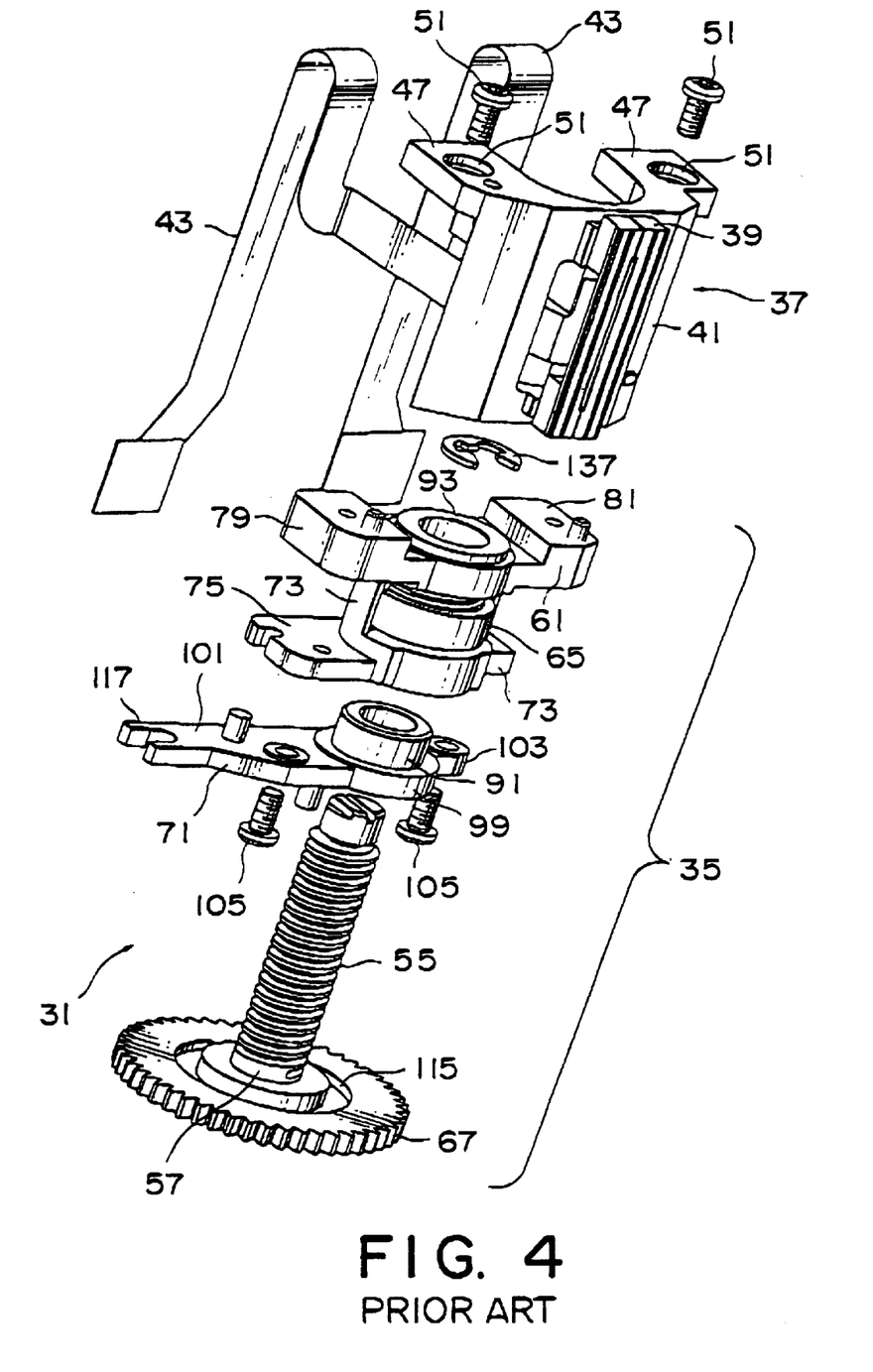
FIG. 4 is an exploded perspective view of a part of the head transfer mechanism illustrated in FIG. 3.
Figure 5:
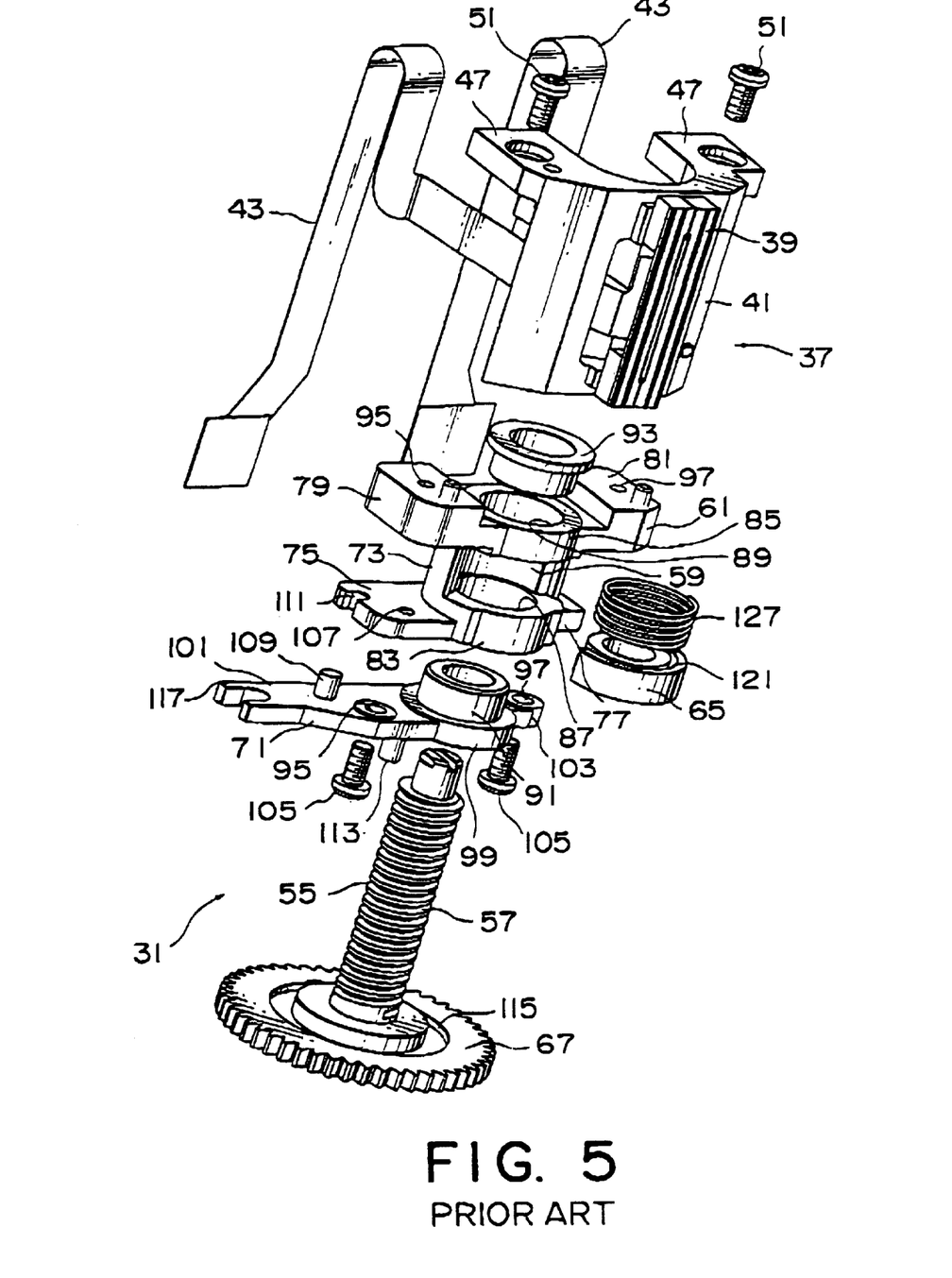
FIG. 5 is an exploded perspective view of a whole of the head transfer mechanism illustrated in FIG. 3.

Referring to FIG. 1, description will be made of the tape drive including the magnetic tape head actuator assembly according to the previous technique. FIG. 1 is a plan view showing the tape drive in a state where an upper cover is removed.

The tape drive 15 is adapted to receive a tape cartridge (not shown) and includes a take-up reel 17 in the interior thereof. The take-up reel 17 may be called a spool. The tape drive 15 comprises a generally rectangular housing (chassis) 21 having a common base 19. The base 19 has two spindle motors (reel motors) 23 and 25. The first spindle motor 23 has the spool (take-up reel) 17 permanently mounted to the base 19. The spool 17 is dimensioned to accept a magnetic tape (not shown) streaming at a relatively high speed. The second spindle motor (reel motor) 25 is adapted to receive the removable tape cartridge. The removable tape cartridge is manually or automatically inserted into the drive 15 via a slot 27 formed on the housing 21 of the drive 15 in an inserting direction depicted by an arrow A.

When the tape cartridge is inserted into the slot 27, the cartridge is engaged with the second spindle motor (reel motor) 25. Prior to rotation of the first and the second spindle motors (reel motors) 23 and 25, the tape cartridge is connected to the permanently mounted spool (take-up reel) 17 by means of a mechanical buckling mechanism (not shown). A number of rollers (guide rollers) 29 positioned between the tape cartridge and the permanent spool 17 guide the magnetic tape as it streams at a relatively high speed back and forth between the tape cartridge and the permanently mounted spool 17.

The housing 21 comprises a sheet metal chassis made of an iron-based magnetic material.

The tape drive 15 further comprises a magnetic tape head actuator assembly (hereinafter may simply be called "actuator assembly") 31. The magnetic tape head actuator assembly 31 is positioned between the take-up spool 17 and the tape cartridge along a tape path (not shown) defined by the rollers 29. In operation, the magnetic tape streams back and forth between the take-up spool 17 and the tape cartridge, coming into close proximity to the magnetic tape head actuator assembly 31 while streaming along the defined tape path.

Next referring to FIGS. 2 through 6, description will be made of the magnetic tape head actuator assembly 31 according to the previous technique.

As illustrated in FIGS. 2 through 5, the magnetic tape head actuator assembly 31 comprises a tape head assembly (hereinafter may simply be called "head assembly") 37 and a head transfer mechanism 35. The tape head assembly 37 comprises a magnetic head (head) 39 extending in a vertical direction, a head holder 41 holding the magnetic head 39, and a pair of flexible printed circuits (FPCs) 43 for electrically connecting the magnetic head 39 and an external circuit (not shown).

The head holder 41 comprises a head mounting portion 45 on which the magnetic head 39 is mounted, and a pair of flanges 47 extending from both sides of an upper end of the head mounting portion 45 in a direction perpendicular to the head mounting portion 45 to face each other. Each of the flanges 47 has a hole 51 adapted to receive a screw 49. By screw-engaging the screw 49 through the hole 51, the tape head assembly 37 is coupled to the head transfer mechanism 35 which will later be described. The head mounting portion 45 has an opening 53 formed at an approximate center thereof. Through the opening 53, one ends of the pair of flexible printed circuits (FPC) 43 and the magnetic head 39 are electrically connected.

Figure 7:
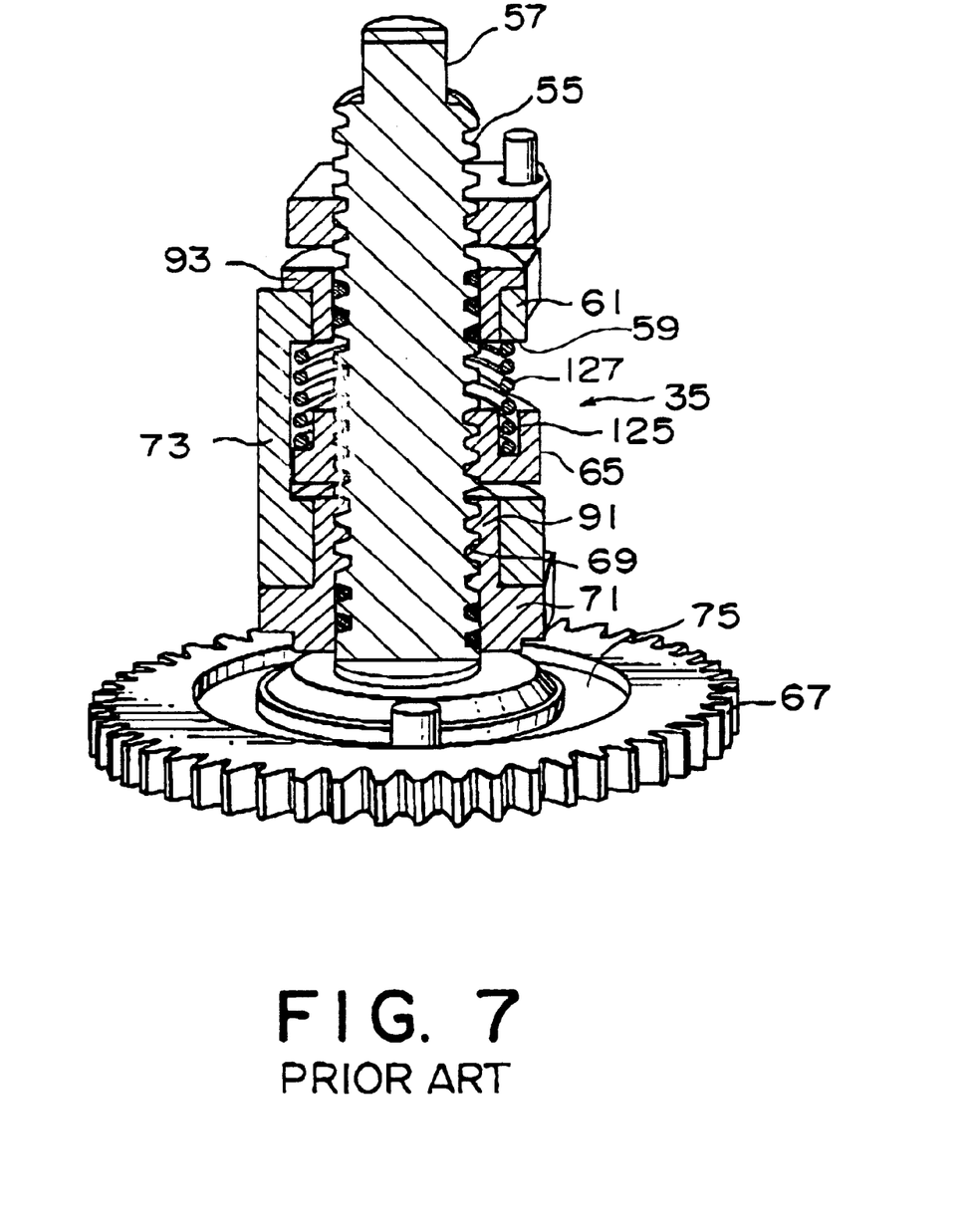
FIG. 7 is an exploded sectional view showing a characteristic part of the actuator assembly illustrated in FIG. 6.

On the other hand, as best shown in FIG. 7, the head transfer mechanism 35 comprises a lead screw (external-threaded shaft) 57 having a rotation center axis O extending in the vertical direction and provided with a thread ridge 55, a generally I-shaped head lift 61 which has a hollow center portion 59 opened in a semicylindrical area (hereinafter called "hollow opened portion") and which serves to hold the tape head assembly 37 and to move the tape head assembly 37 up and down, a preload bushing 65 arranged in the hollow opened portion 59 of the head lift 61 and having a thread groove 63 engaged with the lead screw 57, a lead screw gear 67 attached to a lower end of the lead screw 57 and driven by another driving means for rotating the lead screw 57 around the rotation center axis O, and a head guide 71 coupled to the head lift 61, as will later be described, and having a thread groove 69 engaged with the lead screw 57. In cooperation with the preload bushing 65, the head guide 71 moves the head lift 61 in an extending direction (vertical direction) of the rotation center axis O following the rotation of the lead screw 57 around the rotation center axis O.

The head lift 61 has a hollow cylindrical portion 73 having the hollow opened portion 59 for receiving the preload bushing 65, a pair of legs 75 and 77 extending from a lower end of the hollow cylindrical portion 73 laterally on both sides, and a pair of arms 79 and 81 formed at an upper end of the hollow cylindrical portion 73 to laterally extend on the both sides. The cylindrical portion 73 has a lower end portion 83 and an upper end portion 85 which have circular openings 87 and 89, respectively. In the circular openings 87 and 89, a hollow head portion 91 of the head guide 71 and a slide bearing 93 for the lead screw 57 are arranged, respectively. The hollow head portion 91 is provided with the thread groove 69. The pair of arms 79 and 81 have upper surfaces provided with screw holes 95 and 97 to which the screws 51 are screw-engaged, respectively.

The head guide 71 has the hollow head portion 91 provided with the thread groove 69, a hollow body portion 99 extending downward from the hollow head portion 91 and brought into contact with a lower surface of the lower end portion 83 of the cylindrical portion 73 of the head lift 61, and a pair of arms 101 and 103 extending from the body portion 99 to laterally on both sides. The hollow body portion 99 acts as a slide bearing for the lead screw 57.

The arms 101 and 103 of the head guide 71 have the screw holes 95 and 97 through which screws 105 are inserted. Through the screw holes 95 and 97, the screws 105 are screw-engaged with thread grooves 107 formed in the pair of legs 75 and 77 of the head lift 61 (the thread groove in the leg 77 is not illustrated). Thus, the head guide is fixed to the head lift 61.

The one arm 101 of the head guide 71 laterally extends to a length greater than that of the other arm 103. The one arm 101 has a first protrusion 109 of a solid cylindrical shape protruding upward. The first protrusion 109 is engaged with an engaging groove 111 formed at an end of the one leg 75 of the head lift 61. As a consequence, the head guide 71 is positioned with respect to the head lift 61. Furthermore, the one arm 101 has a second protrusion 113 of a solid cylindrical shape protruding downward. The second protrusion 113 is inserted into an annular grove 115 formed on the lead screw gear 67. Furthermore, the one arm 101 is provided with a generally U-shaped guiding portion 117 formed at its end. The guiding portion 117 is coupled to a guide rod 33 (FIG. 1) to be slidable in the vertical direction and serves to prevent the rotation of the head lift 61.

Figure 8:
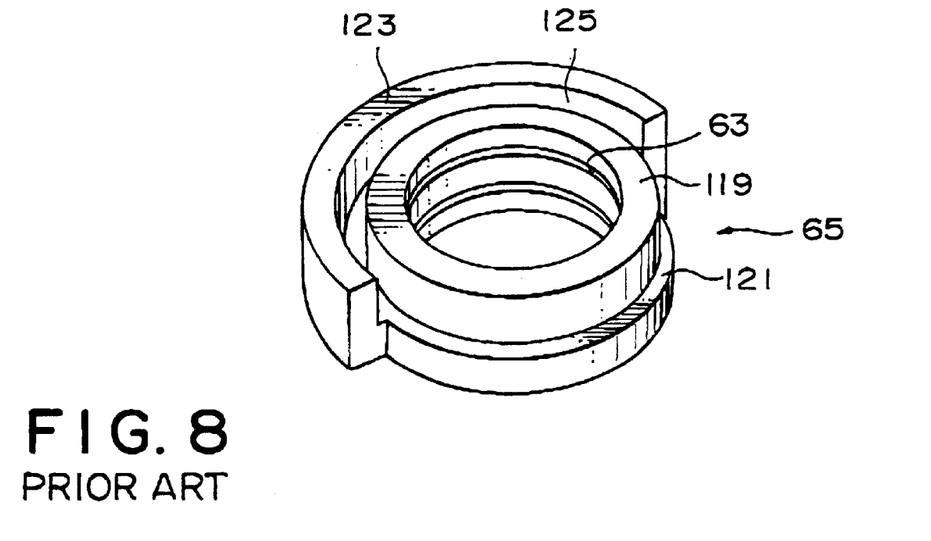
FIG. 8 is an enlarged perspective view of a preload bushing in FIG. 5.

As illustrated in FIG. 8, the preload bushing 65 has a hollow cylindrical portion 119 provided with the thread groove 63, an annular receiving portion 121 formed at a lower end of the hollow cylindrical portion 119 and extending radially outward, and a semicylindrical portion 123 formed at an outer periphery of the receiving portion 121 and extending upward therefrom in an approximate semicircular area. Between the hollow cylindrical portion 119 and the semicylindrical portion 123, a half-ring groove 125 is defined.

Figure 6:
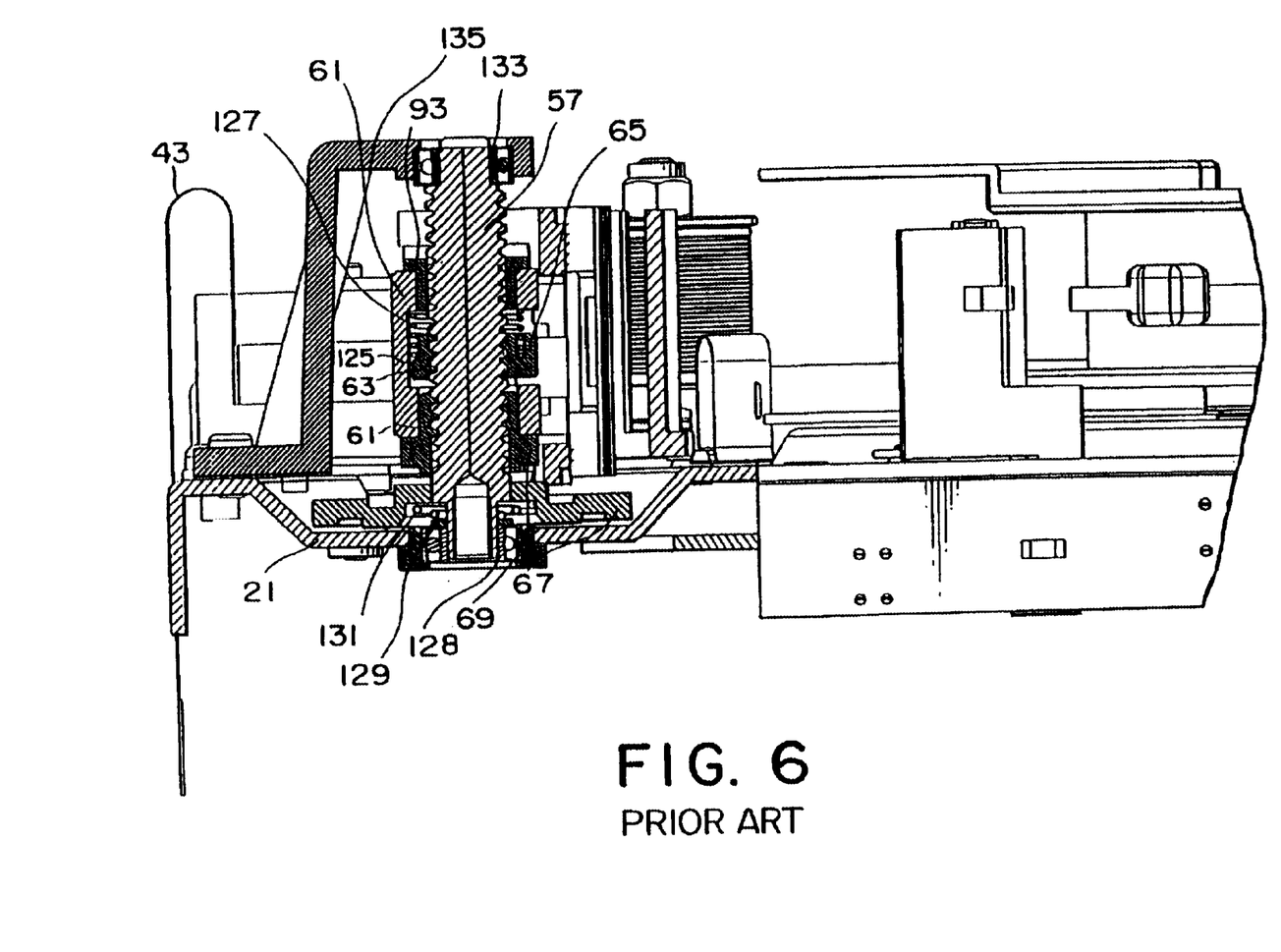
FIG. 6 is a sectional view taken along a line VI—VI in FIG. 1.

As illustrated in FIG. 6, a preload spring 127 in a compressed state is inserted into the groove 125 and is located between the preload bushing 65 and a lower surface of the upper end portion 85 of the head lift 61.

Figure 9:
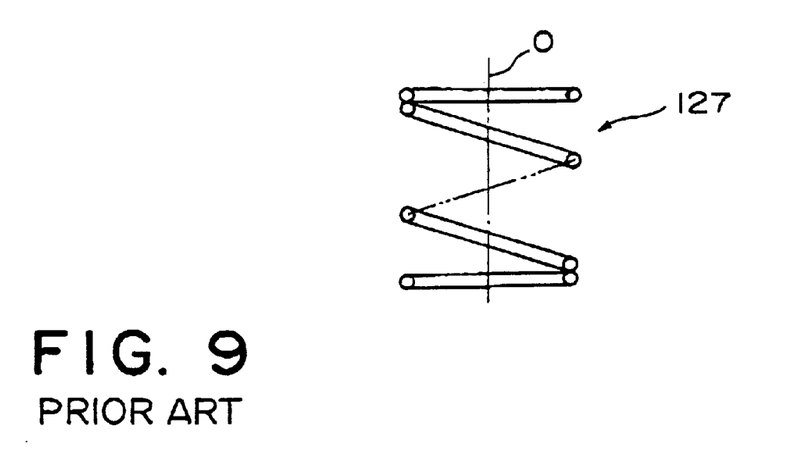
FIG. 9 is a schematic front view of a preload spring in FIG. 5.

As illustrated in FIG. 9, the preload spring 127 is a compression coil spring. Specifically, by the preload spring 127, the preload bushing 65 is continuously subjected to a downward pressing force along the rotation center axis O of the lead screw 57 and the head lift 61 is continuously subjected to an upward pressing force along the rotation center axis O of the lead screw 57. Also, the head guide 71 is continuously subjected to the upward pressing force along the rotation center axis O of the lead screw 57 because the head guide 71 is attached to the head lift 61.

A combination of the preload bushing 65 and the preload spring 127 serves as a backlash preventing mechanism for preventing backlash of the actuator assembly 31. More in detail, before assembling the actuator assembly 31, the thread groove 63 of the preload bushing 65 is offset by a half pitch with respect to the thread groove 69 of the head guide 71. In this state, the lead screw 57 is successively inserted into the head guide 71, the preload bushing 65, and the bearing 93, as illustrated in FIG. 6. As described above, by the preload spring 127, the preload bushing 65 and the head guide 71 are subjected to the downward pressing force along the rotation center axis O of the lead screw 57 and the upward pressing force along the rotation center axis O of the lead screw 57, respectively. Therefore, while the head lift 61 is moved up and down along the rotation center axis O of the lead screw 57 following the rotation of the lead screw 57 in a clockwise or a counterclockwise direction, an upper surface of the thread groove 63 of the preload bushing 65 is continuously kept in frictional contact with a lower surface of the thread ridge of the lead screw 57 while a lower surface of the thread groove 69 of the head guide 71 is continuously kept in frictional contact with an upper surface of the thread ridge of the lead screw 57. Thus, it is possible to prevent backlash between the lead screw 57 and the head lift 61 during movement of the head lift following the rotation of the lead screw 57.

Because of little variation in elastic force of the preload bushing 65 and the preload spring 127, it is possible to obtain a stable pressing force in an axial direction of the lead screw 57.

As is obvious from FIGS. 6 and 7, the lead screw 57 has a lower end portion rotatably attached to the chassis 21 through a bearing 128. On the bearing 128, the lead screw gear 67 is mounted through a washer 129 and a lift spring 131. The lead screw 57 has an upper end portion rotatably attached to a bearing holder 135 through a bearing 133. The bearing holder 135 is fixedly mounted on the chassis 21. Between the bearing 133 and the thread ridge portion of the lead screw 57, an E ring 137 (FIG. 4) is interposed.

Now, referring to FIGS. 10 through 13, an embodiment of this invention will be described.

Figure 10:
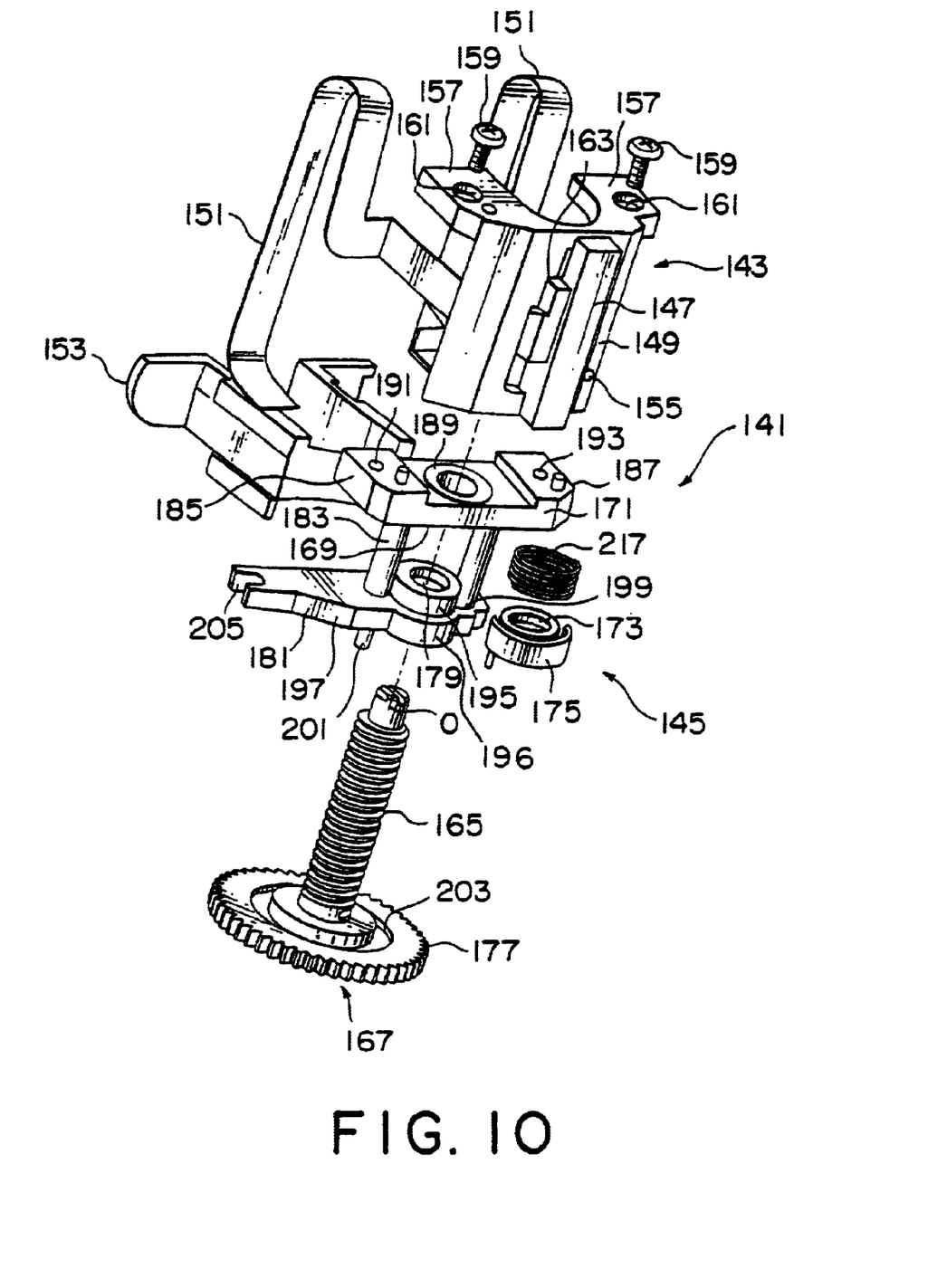
FIG. 10 is an exploded view showing a magnetic tape head assembly according to an embodiment of this invention.

Referring to FIG. 10, description will be made of a tape drive including a magnetic tape head actuator assembly according to this invention.

As illustrated in FIG. 10, the magnetic tape head actuator assembly 141 comprises a tape head assembly (hereinafter called "head assembly") 143 and a head transfer mechanism 145. The tape head assembly 143 comprises a magnetic head (head) 147 extending in a vertical direction, a head holder 149 holding the magnetic head 147, and a pair of flexible printed circuits (FPCs) 151 for electrically connecting the magnetic head 147 and an external circuit (not shown). The FPCs are provided with ETC clips 153 arranged at their ends to hold and fix the FPCs 151, respectively.

The head holder 149 comprises a head mounting portion 155 on which the magnetic head 147 is mounted, and a pair of flanges 157 extending from both sides of an upper end of the head mounting portion 155 in a direction perpendicular to the head mounting portion 155 to face each other. Each of the flanges 157 has a hole 161 adapted to receive a screw 159. By screw-engaging the screw 159 through the hole 161, the tape head assembly 143 is coupled to the head transfer mechanism 145 which will later be described. The head mounting portion 155 has an opening 163 formed at an approximate center thereof. Through the opening 163, one ends of the pair of flexible printed circuits (FPC) 151 and the magnetic head 147 are electrically connected.

On the other hand, the head transfer mechanism 145 comprises a lead screw (external-threaded shaft) 167 having a rotation center axis O extending in the vertical direction and provided with a thread ridge 165, a generally I-shaped head lift 171 which has a hollow center portion 169 opened in a semicylindrical area (hereinafter called "hollow opened portion") and which serves to holds the tape head assembly 143 and to move the tape head assembly 143 up and down, a preload bushing 175 arranged in the hollow opened portion 169 of the head lift 171 and having a thread groove 173 engaged with the lead screw 167, a lead screw gear 177 attached to a lower end of the lead screw 167 and driven by another driving means for rotating the lead screw 167 around the rotation center axis O, and a head guide 181 coupled to the head lift 171, as will later be described, and having a thread groove 179 engaged with the lead screw 167.

The head lift 171 and the head guide 181 are integrally formed to provide a head elevation guiding portion.

In cooperation with the preload bushing 175, the head guide 181 moves the head lift 171 in an extending direction (vertical direction) of the rotation center axis O following the rotation of the lead screw 167 around the rotation center axis O.

The head lift 171 has a hollow cylindrical portion 183 having the above-mentioned hollow opened portion 169 for receiving the preload bushing 175, and a pair of arms 185 and 187 formed at an upper end of the hollow cylindrical portion 183 to laterally extend on both sides. A hollow head portion 195 is arranged in the cylindrical portion 183. In a hole formed at the center above the hollow head portion 195, a slide bearing 189 for the lead screw 167 is arranged. The hollow head portion 195 is provided with the thread groove 179. The pair of arms 185 and 187 have upper surfaces provided with screw holes 191 and 193 to which the screws 159 are screw-engaged, respectively.

The head guide 181 has the hollow head portion 195 provided with the thread groove 179, a hollow body portion 196 extending downward from the hollow head portion 195 and brought into contact with a lower surface of a lower end portion of the cylindrical portion 183 of the head lift 171, and a pair of arms 197 and 199 extending from the body portion 196 laterally on both sides. The hollow body portion 195 acts as a slide bearing for the lead screw 167.

The one arm 197 of the head guide 181 laterally extends to a length greater than that of the other arm 199. The one arm 197 has a solid cylindrical protrusion 201 protruding downward. The protrusion 201 is inserted into an annular groove 203 formed on the lead screw gear 177. The one arm 197 is provided with a generally U-shaped guiding portion 205 formed at its end. The guiding portion 205 is coupled to the guide rod 33 (FIG. 1) to be slidable in the vertical direction and serves to prevent the head guide 181 from being rotated together with the head lift 17.

Figure 12:
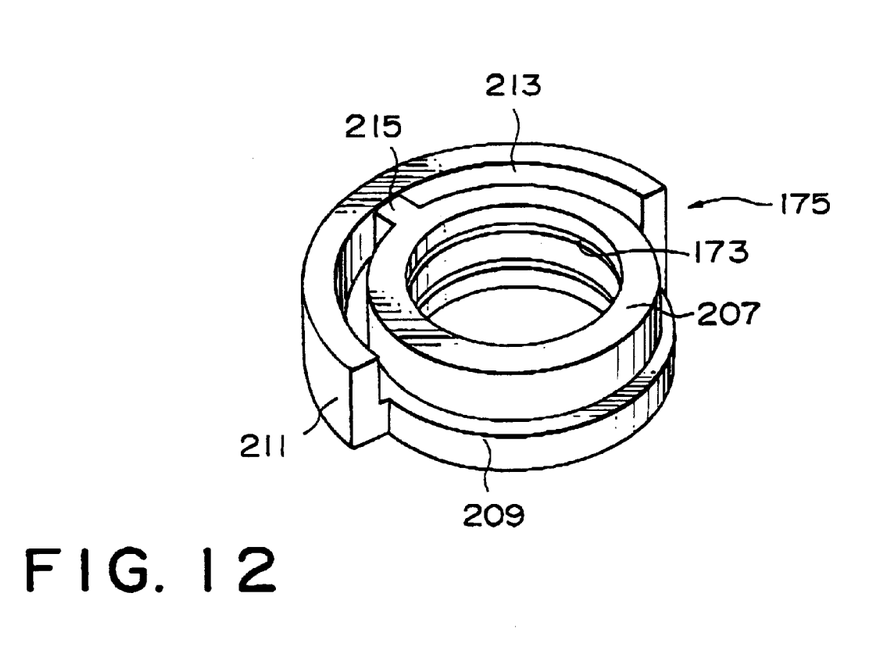
FIG. 12 is a perspective view showing a preload bushing of the magnetic tape head actuator assembly in FIG. 10.

As illustrated in FIG. 12, the preload bushing 175 has a hollow cylindrical portion 207 provided with the thread groove 173, an annular receiving portion 209 formed at a lower end of the hollow cylindrical portion 207 and extending radially outward, and a semicylindrical portion 211 formed at an outer periphery of the receiving portion 209 and extending upward therefrom in an approximate semicircular area. Between the hollow cylindrical portion 209 and the semicylindrical portion 211, a half-ring groove 213 is defined. Furthermore, in this embodiment, a generally rectangular protruding portion 215 is formed as a biasing load direction changing member to be buried in the half-ring groove 213.

Figure 11:
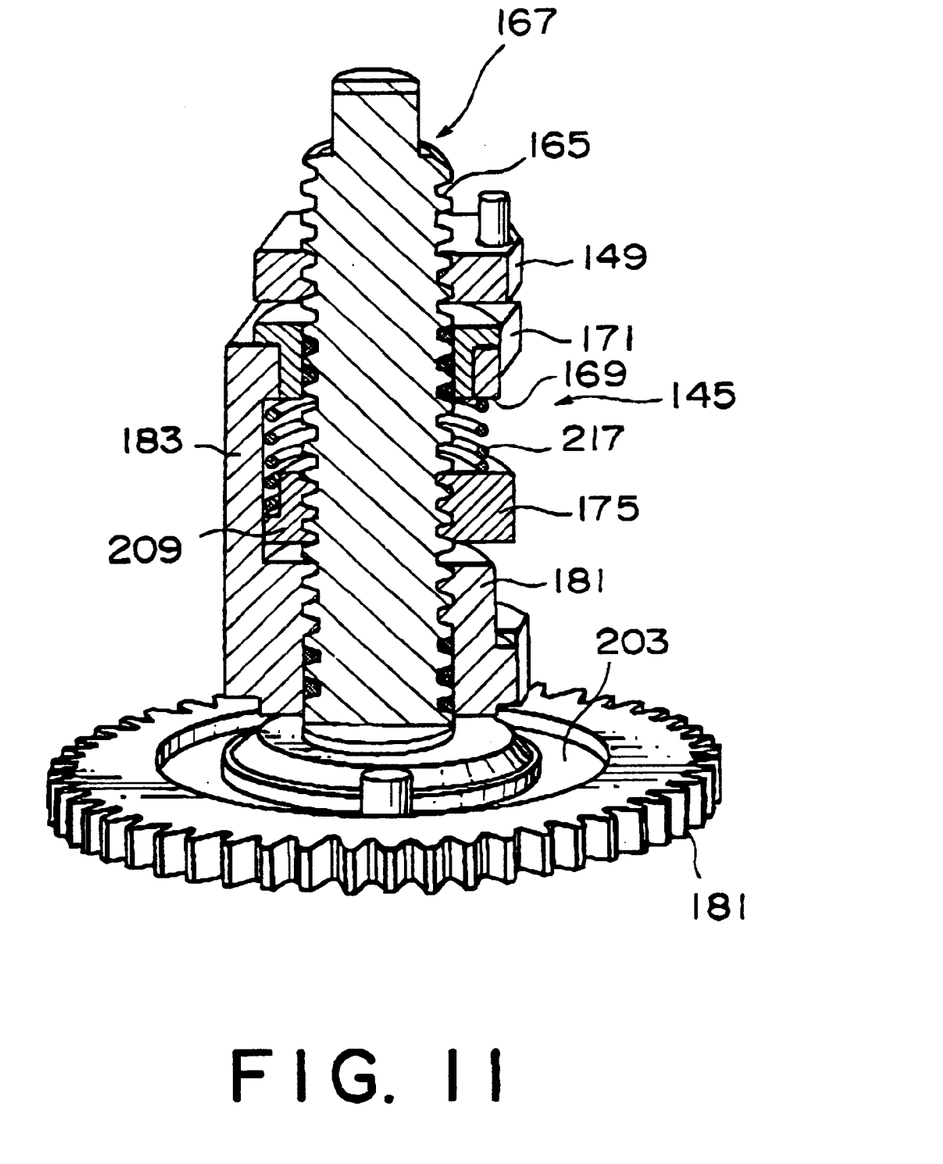
FIG. 11 is a vertical sectional view mainly showing a head transfer mechanism of the magnetic tape head assembly in FIG. 10.

As illustrated in FIG. 11, a preload spring 217 in a compressed state is inserted into the groove 213 and is located between the preload bushing 175 and a lower surface of an upper end portion of the head lift 171. The preload spring 217 is a compression coil spring. Specifically, by the preload spring 217, the preload bushing 175 is continuously subjected to a downward pressing force along the rotation center axis O of the lead screw 167 and the head lift 171 is continuously subjected to an upward pressing force along the rotation center axis O of the lead screw 167. Also, the head guide 181 is continuously subjected to the upward pressing force along the rotation center axis O of the lead screw 167 because the head guide 181 is integrally formed with the head lift 171.

A combination of the preload bushing 175 and the preload spring 217 serves as a backlash preventing mechanism for preventing backlash of the actuator assembly 141. More in detail, before assembling the actuator assembly 141, the thread groove 173 of the preload bushing 175 is offset by a half pitch with respect to the thread groove 179 of the head guide 181. In this state, the lead screw 167 is successively inserted into the head guide 181, the preload bushing 175, and the bearing 189, as illustrated in FIG. 11. As described above, by the preload spring 217, the preload bushing 171 and the head guide 181 are subjected to the downward pressing force along the rotation center axis O of the lead screw 167 and the upward pressing force along the rotation center axis O of the lead screw 167, respectively. Therefore, while the head lift 171 is moved up and down along the rotation center axis O of the lead screw 167 following the rotation of the lead screw 167 in a clockwise or a counterclockwise direction, an upper surface of the thread groove 173 of the preload bushing 175 is continuously kept in frictional contact with an upper surface of the thread ridge of the lead screw 167. On the other hand, a lower surface of the thread groove 179 of the head guide 181 is continuously kept in contact with a lower surface of the thread ridge of the lead screw 167. Thus, it is possible to prevent backlash between the lead screw 167 and the head lift 171 during movement of the head lift following the rotation of the lead screw 167.

In order to absorb a play in a radial direction, the protruding portion 215 as the biasing load direction changing member is provided in the groove of the preload bushing 175 so that the preload spring 213 is given a biasing load. Therefore, when the preload spring 213 is fitted, the biasing load direction intersects with the direction of the axis O. Thus, the biasing load direction is coincident with the direction of tensile strength applied by a tape upon a magnetic head. As a consequence, it is possible to prevent the play of the head transfer mechanism 145 in the radial direction due to lateral pressure applied upon the head.

Figure 13:
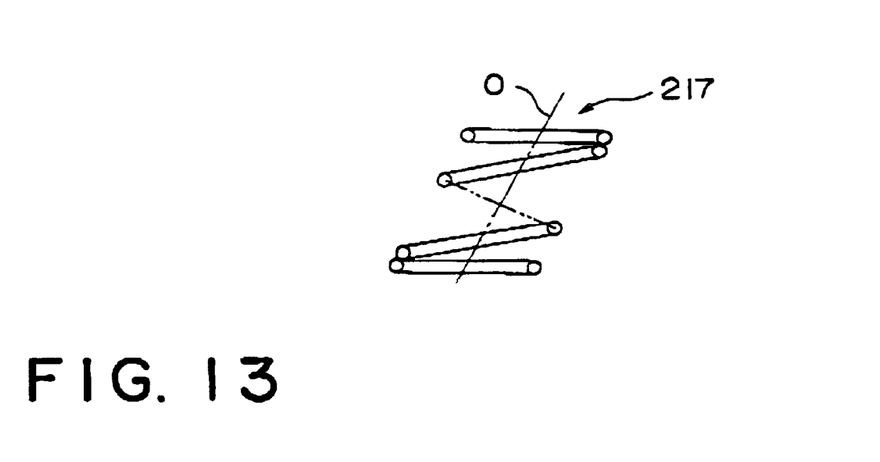
FIG. 13 is a front view showing another example of a preload spring in FIG. 10.

As illustrated in FIG. 13, the center axis O of the preload spring 217 may be inclined. With this structure also, it is possible to shift biasing force into the direction intersecting the axis. Therefore, it is possible to prevent the play of the head transfer mechanism 145 in the radial direction due to the lateral pressure by the tensile strength of the tape applied to the head.

Although this invention has been described in conjunction with the preferred embodiment thereof, it will readily be understood that this invention is not restricted to the foregoing embodiment.

As is obvious from the foregoing description, it is possible according to this invention to provide a head transfer mechanism capable of absorbing a play of a head assembly not only in a thrust direction but also in a radial direction as well as a head actuator assembly and a tape drive using the same.

What is claimed is:

1. A head transfer mechanism for moving a head assembly up and down in an axial direction extending in a vertical direction, wherein said head transfer mechanism comprises:
   a lead screw with a thread ridge having a rotation center axis extending in said axial direction;
   a head elevation guiding member including as an integral structure a head lift with said head assembly mounted thereon and a head guide having a thread groove engaged with said lead screw and serving to move said head lift up and down along said rotation center axis following said rotation of said lead screw, said head lift having a through hole receiving said lead screw inserted therethrough and a hollow opened portion formed at its center;
   a preload bushing arranged in said hollow opened portion of said head lift and having a thread groove engaged with said lead screw; and
   a compression coil spring arranged in said hollow opened portion of said head lift between said preload bushing and said head lift for applying said head lift with a pressing force in said axial direction of said lead screw;
   the head assembly being given a biasing load within said head elevation guiding member in a radial direction of said lead screw.

2. A head transfer mechanism as claimed in claim 1, wherein said preload bushing has an annular receiving portion for receiving an end portion of said compression coil spring, said receiving portion having a protrusion formed at a part on the side of said hollow opened portion.

3. A head transfer mechanism as claimed in claim 1, wherein compression coil spring has a center axis which is inclined.

4. An actuator assembly comprising a head transfer mechanism claimed in any one of claims 1 through 3.

5. A tape drive comprising an actuator assembly claimed in claim 4.

* * * * *